UNITED STATES PATENT OFFICE.

LOUIS CHIOZZA, OF CERVIGNANO, NEAR TRIESTE, AUSTRIA, ASSIGNOR TO ERARD A. MATTHIESSEN, OF CORNWALL, NEW YORK.

PROCESS OF TREATING MAIZE.

SPECIFICATION forming part of Reissued Letters Patent No. 9,947, dated November 29, 1881.

Original No. 167,224, dated August 31, 1875. Application for reissue filed November 4, 1881.

*To all whom it may concern:*

Be it known that I, LOUIS CHIOZZA, of Cervignano, near Trieste, Austria, have invented a new and Improved Process of Treating Maize, of which the following is a specification.

The object of my process of treating maize is to effect the separation of the oily parts of the maize from the farinaceous parts preparatory to the manufacture of the various useful products obtainable therefrom; and my invention consists in immersing the whole grain, previous to crushing, in a solution of one part, by volume, of sulphurous acid in one part of water, by which means the farinaceous parts of the maize are thoroughly softened, and the peculiar gummy substance to which it owes its hardness is entirely eliminated, while the germ or cotyledon is rendered sufficiently elastic to enable it to pass between rollers without being crushed. The steeping may be continued for from ten to fifteen days, or even longer, according to the purpose for which the product is intended, and the quality of the maize, surrounding temperature, and degree of concentration of the sulphurous acid. The steeping should be effected in wooden vats having conical bottoms, with appliances for discharging either the liquid or the grain at will.

It will not be necessary to describe the apparatus employed in the separation of the farinaceous matter from the germs after the grain has been treated as described. Suffice it to state that in the manufacture of flour the grain, after it has been duly softened by the bath above referred to, is fed between crushing-rollers or other crushing mechanism, so set as to allow the germs to pass through unbroken, while the farinaceous matter is properly reduced. These rollers discharge upon a screen, through which the broken farinaceous matter will pass in the form of grits and flour, while the germs and pellicles will pass over the edge of the screen. The parts being thus separated can be gradually exposed to different screens and devices for separating the grades of flour, and the farinaceous matter may be recrushed, if desired; but both subdivisions are, after the first screening, exposed to a gentle drying process, so that they may gradually give off the moisture which they absorbed in the bath. The pellicles and germs can also be conveniently separated and put to different uses.

In the manufacture of starch, currents of water may be utilized after the crushing process to properly affect the crushed matter. The oily matter will be separated and gradually dried, while the starch is dried after the process is finished.

I claim as my invention—

The process herein described of separating the oily from the farinaceous constituents of maize, which consists in first steeping the grain in a solution of sulphurous acid, and then so crushing it as to leave the germs unbroken, and then screening the crushed grain, substantially as and for the purposes set forth.

LOUIS CHIOZZA. [L. S.]

Witnesses:

FREDERIC SILMABL,

JAS. GEDDES, Jr.